O. & G. HENRIKSON.
MOTOR VEHICLE.
APPLICATION FILED DEC. 20, 1916.
1,274,164.
Patented July 30, 1918.
4 SHEETS—SHEET 3.
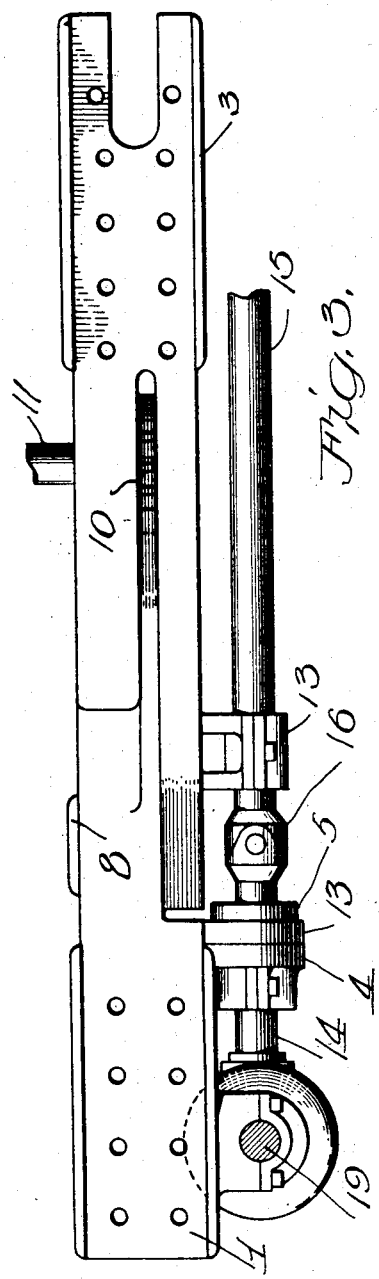
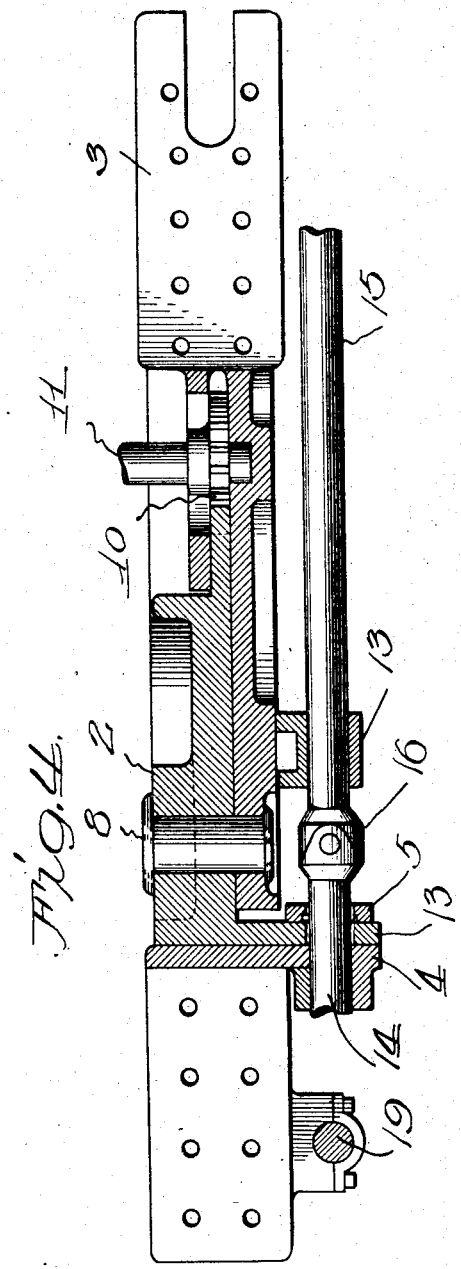
WITNESSES:
INVENTORS
Otto Henrikson
Gustaf Henrikson.

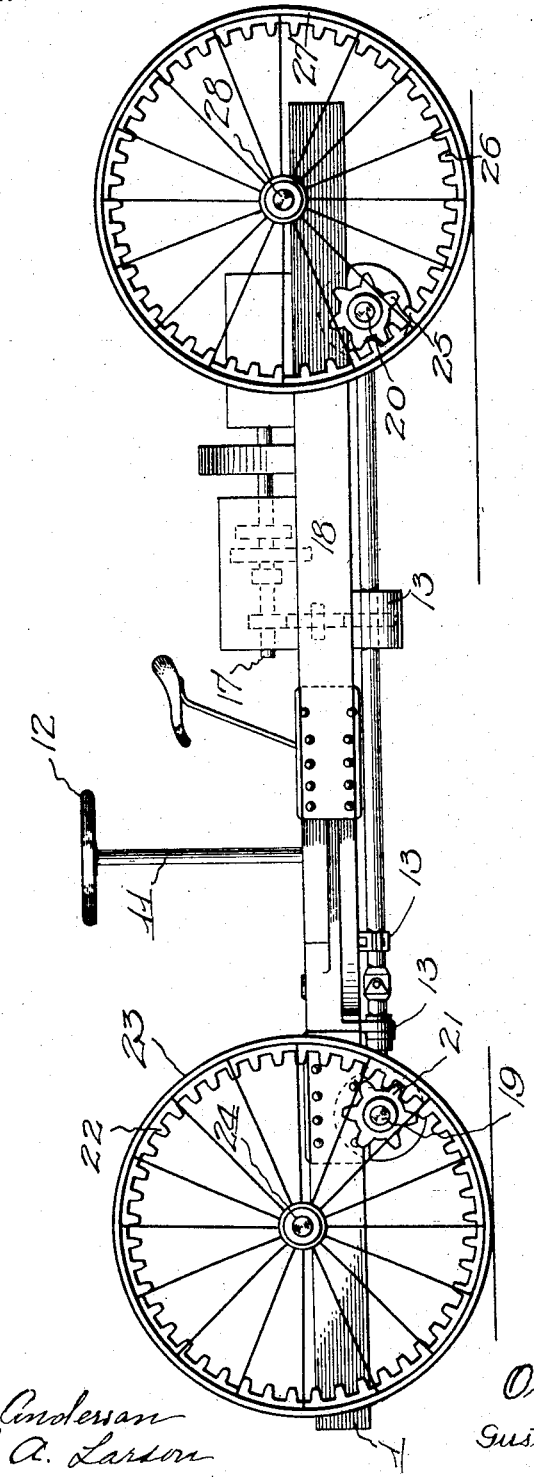

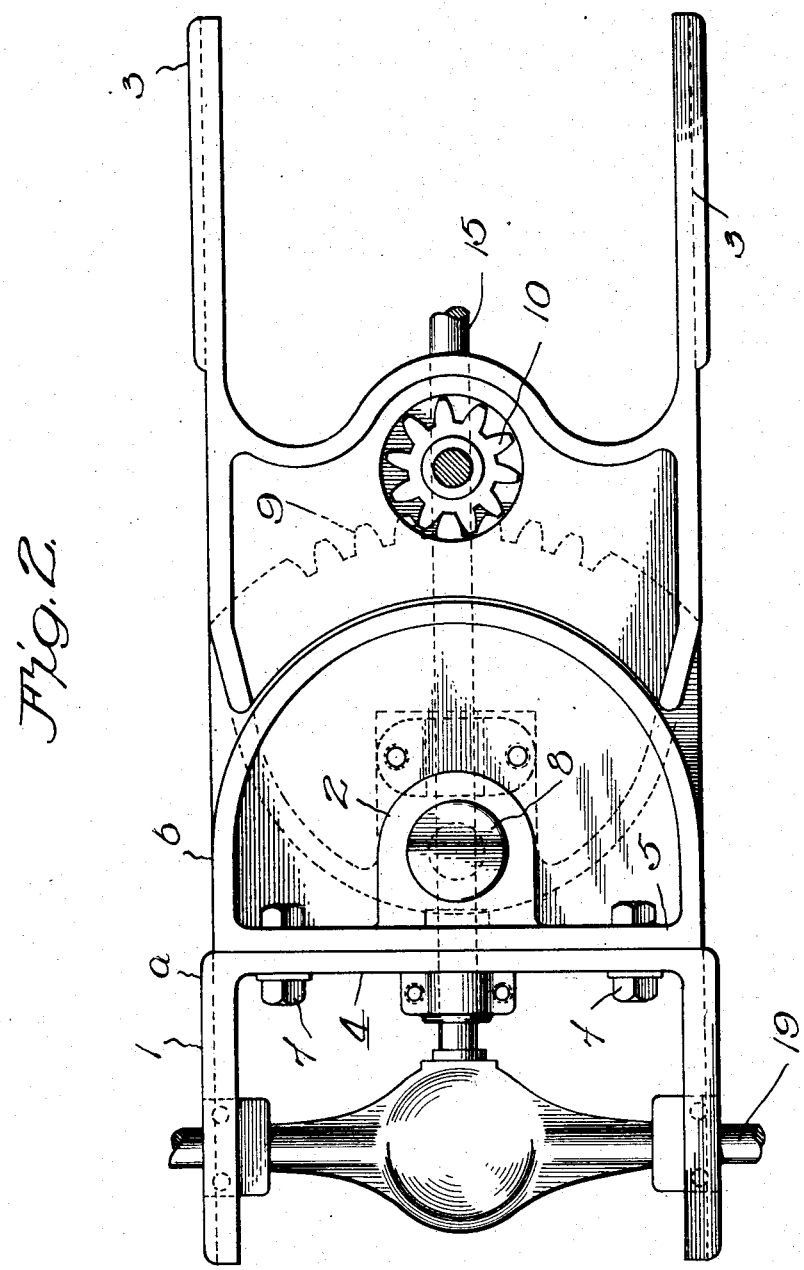

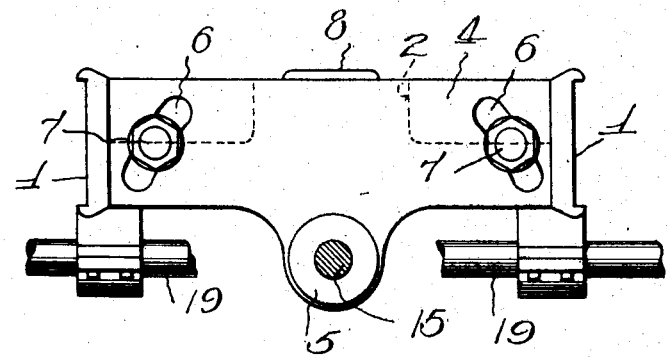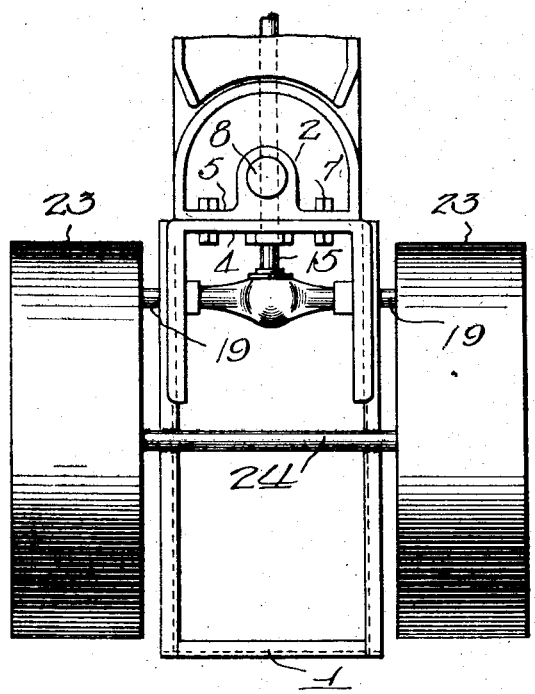

UNITED STATES PATENT OFFICE.

OTTO HENRIKSON, OF MINNEAPOLIS, MINNESOTA, AND GUSTAF HENRIKSON, OF CHICAGO, ILLINOIS.

MOTOR-VEHICLE.

1,274,164.   Specification of Letters Patent.   Patented July 30, 1918.

Application filed December 20, 1916. Serial No. 138,049.

*To all whom it may concern:*

Be it known that we, OTTO HENRIKSON, a citizen of Sweden, and residing in the city of Minneapolis, in the county of Hennepin and State of Minnesota, and GUSTAF HENRIKSON, a citizen of Sweden, residing in Chicago, in the county of Cook and State of Illinois, have jointly invented certain new and useful Improvements in Motor-Vehicles, of which the following is a specification.

This invention relates to improvements in motor vehicles and one of its objects is to provide such a vehicle in which the engine is always capable of positively driving all four of the vehicle wheels at the same time thereby securing greater traction as compared to a vehicle having only two driving wheels. A further object is to provide a vehicle having a sectional frame, the sections of which are adjustably connected at points between the front and rear axles. A further object is to provide a sectional frame, the sections of which are capable of a limited relative vertical adjustment to permit advantageous adjustment of the gearing.

With the foregoing and other objects in view the invention consists in the combination and arrangement of parts to be hereinafter fully described in this specification, pointed out in the appended claims and illustrated in the accompanying drawings which form a part of the specification and in which—

Figure 1 is a side elevation of our improved vehicle.

Fig. 2 is an enlarged fragmentary plan view.

Fig. 3 is a view in side elevation of Fig. 2.

Fig. 4 is a longitudinal sectional view through Fig. 3.

Fig. 5 is a fragmentary front elevation showing the relative vertical adjustment of the frame sections.

Fig. 6 is a plan view of the forward and intermediate sections showing the arrangement of the forward differential shaft and the front wheels.

Like reference characters denote corresponding parts throughout the several views.

This invention comprises a three-piece frame formed of a forward section 1, a central or intermediate section 2 and a rear section 3. The forward and intermediate frame sections are formed, respectively, with parallel vertical abutting walls 4, 5 each of which is formed with the alined arcuate slots 6 through which the connecting bolts 7 extend that connect the said frame sections and permit relative adjustment of the same to permit a satisfactory working engagement of the gearing. The intermediate frame section 2 is connected to the rear section 3 by the pivot bolt 8 which permits a relative lateral movement of the sections. The rear end of the intermediate frame section 2 terminates in a toothed segment 9 which meshes with a pinion 10 fast upon the steering shaft 11 operable by the steering wheel 12 and journaled in bearings formed in the rear frame section 3.

In bearings 13 depending from the frame of the machine the drive shaft, comprising the forward section 14 and rear section 15 connected by universal joint 16, is journaled, the rear section of said shaft receiving power from the motor shaft 17 through the medium of drive gears 18 and said drive shaft drives the front transverse shaft 19 and the rear transverse shaft 20 which shafts are both provided with a standard form of differential which forms no part of the invention. The front transverse shaft 19 carries a pinion 21 at each end which is in mesh with the inner peripheral teeth 22 of the front traction wheels 23 which are loose upon the front axle 24; and the rear transverse shaft 20 is terminally provided with the pinions 25 in mesh with the inner peripheral teeth 26 of the rear traction wheels 27 loose upon the rear vehicle axle 28. The construction of the machine is such as to permit a short turn of the same or travel over rough and uneven roads without displacement of the gearing or undue wear upon the same.

What is claimed is:—

1. In a four wheel drive motor vehicle frame, comprising a forward, an intermediate, and a rear section, the forward and intermediate sections being formed with vertical abutting walls, the wall of the forward section having arcuate slots, bolts sliding in these slots and fixed in the wall of the intermediate section, serving as connection between said walls a pivot bolt connecting the intermediate and rear sections of said frame to permit, by manually operable steering mechanism, the lateral adjustment of said sections.

2. In a four wheel drive motor vehicle frame, comprising a forward, an intermediate, and a rear section, the intermediate section terminating in a toothed segment projected between spaced portions of the rear section, the forward and intermediate sections being formed with vertical abutting walls, the forward section having arcuate slots, bolts sliding in these slots and fixed in the wall of the intermediate section, serving as connection between said walls; a pivot bolt connecting the intermediate and rear section of said frame to permit the lateral movement of said sections, a pinion in mesh with the toothed segment of the intermediate section, said pinion fast upon a vertical shaft, carried by the rear section, and manually operated, serving as the steering mechanism.

In testimony that we claim the foregoing as our own we have hereto affixed our signatures in the presence of subscribing witnesses.

OTTO HENRIKSON.
GUSTAF HENRIKSON.

Witness as to Otto Henrikson's signature:
HULDAH H. HENRIKSON.

Witness as to Gutaf Henrikson's signature:
FRED W. DRINKAUS.

Copies of this patent may be obtained for five cents each, by addressing the "Commissioner of Patents, Washington, D. C."